US009582685B2

(12) United States Patent
Fischer et al.

(10) Patent No.: US 9,582,685 B2
(45) Date of Patent: Feb. 28, 2017

(54) METHOD TO DETECT CLONED SOFTWARE

(75) Inventors: Jean-Bernard Fischer, Rochejean (FR); Patrik Marcacci, Renens (CH); Christian Schwarz, Vuarrens (CH); Brecht Wyseur, Penthalaz (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 415 days.

(21) Appl. No.: 13/988,292

(22) PCT Filed: Nov. 15, 2011

(86) PCT No.: PCT/IB2011/055083
§ 371 (c)(1),
(2), (4) Date: Jul. 31, 2013

(87) PCT Pub. No.: WO2012/066471
PCT Pub. Date: May 24, 2012

(65) Prior Publication Data
US 2013/0312119 A1    Nov. 21, 2013

Related U.S. Application Data

(60) Provisional application No. 61/415,363, filed on Nov. 19, 2010.

(51) Int. Cl.
*G06F 7/04* (2006.01)
*G06F 21/64* (2013.01)
(Continued)

(52) U.S. Cl.
CPC ............ *G06F 21/64* (2013.01); *G06F 21/121* (2013.01); *G06F 21/16* (2013.01);
(Continued)

(58) Field of Classification Search
CPC ...... G06F 21/64; G06F 21/10; G06F 21/6218; H04L 9/3281; H04L 9/3223
(Continued)

(56) References Cited

U.S. PATENT DOCUMENTS 4,578,530 A    3/1986 Zeidler
4,672,533 A    6/1987 Noble et al.
(Continued)

FOREIGN PATENT DOCUMENTS

EP    0 448 369    9/1991
EP    0 836 160    4/1998
(Continued)

OTHER PUBLICATIONS

International Search Report issued in International Application No. PCT/IB2011/055083 dated Apr. 12, 2012.
(Continued)

*Primary Examiner* — Ali Abyaneh
(74) *Attorney, Agent, or Firm* — DLA Piper LLP (US)

(57) ABSTRACT

Method to detect cloned software being used on a client user unit. An initialization phase comprises: defining a tag value as being equal to an initial random value, opening a new record storing the tag value and introducing the tag value into the client user unit. An operating phase comprises: preparing a client message comprising the request and a value depending on the tag value; sending the client message to the server; and checking if the tag value of the client message is correct with respect to the stored tag value. If they do not match, the requested service is denied. If they do match, the method sends a server message to the user unit; updates the tag value with a new tag value; and stores the new tag value on the server and user unit.

13 Claims, 2 Drawing Sheets

(51) Int. Cl.

| | |
|---|---|
| *H04N 21/258* | (2011.01) |
| *H04N 21/426* | (2011.01) |
| *H04N 21/442* | (2011.01) |
| *H04N 21/6334* | (2011.01) |
| *H04N 21/6377* | (2011.01) |
| *G06F 21/12* | (2013.01) |
| *G06F 21/16* | (2013.01) |

(52) U.S. Cl.
CPC . *H04N 21/25816* (2013.01); *H04N 21/42684* (2013.01); *H04N 21/44236* (2013.01); *H04N 21/6334* (2013.01); *H04N 21/6377* (2013.01)

(58) Field of Classification Search
USPC .................................................... 726/32, 27
See application file for complete search history.

(56) References Cited

U.S. PATENT DOCUMENTS

| | | | |
|---|---|---|---|
| 5,029,207 A | 7/1991 | Gammie | |
| 5,036,461 A | 7/1991 | Elliott et al. | |
| 5,237,610 A | 8/1993 | Gammie et al. | |
| 5,266,782 A | 11/1993 | Alanara et al. | |
| 5,365,587 A | 11/1994 | Campbell et al. | |
| 5,434,919 A | 7/1995 | Chaum | |
| 5,633,914 A | 5/1997 | Rosa | |
| 5,661,806 A | 8/1997 | Nevoux et al. | |
| 5,664,017 A | 9/1997 | Gressel et al. | |
| 5,729,596 A | 3/1998 | Reeder et al. | |
| 5,748,737 A | 5/1998 | Daggar | |
| 5,825,875 A | 10/1998 | Ugon | |
| 5,883,960 A | 3/1999 | Maruyama et al. | |
| 5,887,253 A | 3/1999 | O'Neil et al. | |
| 5,933,773 A | 8/1999 | Barvesten | |
| 5,933,785 A | 8/1999 | Tayloe | |
| 5,937,068 A | 8/1999 | Audebert | |
| 5,991,411 A | 11/1999 | Kaufman et al. | |
| 6,070,171 A * | 5/2000 | Snyder .................... G06F 21/10 | |
| 6,072,870 A | 6/2000 | Nguyen et al. | |
| 6,118,873 A | 9/2000 | Lotspiech et al. | |
| 6,199,113 B1 | 3/2001 | Alegre et al. | |
| 6,246,771 B1 | 6/2001 | Stanton et al. | |
| 6,253,027 B1 | 6/2001 | Weber et al. | |
| 6,286,103 B1 | 9/2001 | Maillard et al. | |
| 6,434,238 B1 | 8/2002 | Chaum et al. | |
| 6,434,403 B1 | 8/2002 | Ausems et al. | |
| 6,463,537 B1 | 10/2002 | Tello | |
| 6,501,946 B1 | 12/2002 | Farah et al. | |
| 6,567,915 B1 | 5/2003 | Guthery | |
| 6,575,372 B1 | 6/2003 | Everett et al. | |
| 6,584,326 B1 | 6/2003 | Boydston et al. | |
| 6,609,116 B1 | 8/2003 | Lotspiech | |
| 6,650,753 B1 | 11/2003 | Lotspiech et al. | |
| 6,662,299 B1 | 12/2003 | Price, III | |
| 6,697,489 B1 | 2/2004 | Candelore | |
| 6,711,262 B1 | 3/2004 | Vatanen | |
| 6,718,314 B2 | 4/2004 | Chaum et al. | |
| 6,739,504 B2 | 5/2004 | Daugaard | |
| 6,772,331 B1 | 8/2004 | Hind et al. | |
| 6,799,272 B1 | 9/2004 | Urata | |
| 6,832,319 B1 | 12/2004 | Bell et al. | |
| 6,851,607 B2 | 2/2005 | Orus et al. | |
| 6,857,067 B2 | 2/2005 | Edelman | |
| 6,883,097 B1 | 4/2005 | Lotspiech et al. | |
| 6,976,171 B1 | 12/2005 | Ritter et al. | |
| 7,117,364 B1 | 10/2006 | Hepper et al. | |
| 7,171,565 B1 | 1/2007 | Martens et al. | |
| 7,177,844 B2 | 2/2007 | Fish et al. | |
| 7,191,335 B1 | 3/2007 | Maillard | |
| 7,228,427 B2 | 6/2007 | Fransdonk | |
| 7,302,058 B2 | 11/2007 | Candelore | |
| 7,305,555 B2 | 12/2007 | Okimoto et al. | |
| 7,318,159 B2 | 1/2008 | Salmivalli | |
| 7,336,787 B2 | 2/2008 | Unger et al. | |
| 7,380,133 B2 | 5/2008 | Jaquier | |
| 7,409,562 B2 | 8/2008 | Kahn et al. | |
| 7,480,381 B2 | 1/2009 | Kahn et al. | |
| 7,539,514 B2 | 5/2009 | Shich et al. | |
| 7,551,593 B2 | 6/2009 | Haller et al. | |
| 7,676,436 B2 | 3/2010 | Harper | |
| 7,760,882 B2 * | 7/2010 | Tidwell et al. ............... 380/270 |
| 7,797,552 B2 | 9/2010 | Kahn et al. | |
| 7,925,016 B2 | 4/2011 | Candelore | |
| 8,478,998 B2 * | 7/2013 | Ford .............................. 713/168 |
| 8,533,459 B2 | 9/2013 | Candelore | |
| 8,745,401 B1 * | 6/2014 | Hintz et al. .................... 713/176 |
| 8,793,509 B1 * | 7/2014 | Nelson et al. ................. 713/193 |
| 2001/0015694 A1 | 8/2001 | Lassle et al. | |
| 2002/0035687 A1 | 3/2002 | Skantze | |
| 2002/0047044 A1 | 4/2002 | Orus et al. | |
| 2002/0062452 A1 | 5/2002 | Ford | |
| 2002/0106087 A1 | 8/2002 | Lotspiech et al. | |
| 2002/0170054 A1 | 11/2002 | Kudelski et al. | |
| 2003/0061477 A1 | 3/2003 | Kahn et al. | |
| 2003/0097344 A1 | 5/2003 | Chaum et al. | |
| 2003/0135471 A1 | 7/2003 | Jaquier et al. | |
| 2003/0135747 A1 | 7/2003 | Jaquier | |
| 2003/0187999 A1 | 10/2003 | Callum | |
| 2004/0035926 A1 | 2/2004 | Orus et al. | |
| 2004/0151314 A1 | 8/2004 | Candelore | |
| 2005/0005120 A1 | 1/2005 | Kahn et al. | |
| 2006/0059544 A1 | 3/2006 | Guthrie et al. | |
| 2006/0107323 A1 | 5/2006 | McLean | |
| 2006/0190410 A1 | 8/2006 | Harper | |
| 2006/0224901 A1 * | 10/2006 | Lowe ............................. 713/186 |
| 2007/0192829 A1 | 8/2007 | Ford | |
| 2007/0252551 A1 | 11/2007 | Clothier et al. | |
| 2010/0020963 A1 | 1/2010 | Candelore | |
| 2010/0169463 A1 | 7/2010 | Harper | |
| 2010/0235624 A1 | 9/2010 | Candelore | |
| 2013/0322625 A1 | 12/2013 | Candelore | |

FOREIGN PATENT DOCUMENTS

| | | |
|---|---|---|
| WO | WO 93/07715 | 4/1993 |
| WO | WO 96/25814 | 8/1996 |
| WO | WO 99/01848 | 1/1999 |
| WO | WO 99/25140 | 5/1999 |
| WO | WO 99/57901 | 11/1999 |
| WO | WO 00/38035 | 6/2000 |
| WO | WO 00/59222 | 10/2000 |
| WO | WO 02/17555 | 2/2002 |
| WO | WO 02/052389 | 7/2002 |
| WO | WO 03/028287 | 4/2003 |

OTHER PUBLICATIONS

Written Opinion issued in International Application No. PCT/IB2011/055083 dated Apr. 12, 2012.
English language abstract of FR 2762118 dated Oct. 16, 1998.
English language abstract of FR 2681165 dated Mar. 12, 1993.
English language abstract of JP 2002-540736 published Nov. 26, 2002.
Machine English language translation of JP 2002-540736 published Nov. 26, 2002.
English language abstract and translation of JP 06-197104 published Jul. 15, 1994.
English language abstract and translation of JP 05-030509 published Feb. 5, 1993.
English language abstract of JP 02-148930 published Jun. 7, 1990.
English language abstract of EP 0 997 853 published May 3, 2000.
English language abstract of EP 0 663 650 published Jul. 19, 1995.
English language abstract of EP 0 707 290 published Apr. 17, 1996.
English language abstract of EP 0 530 601 published Mar. 10, 1993.

* cited by examiner

METHOD TO DETECT CLONED SOFTWARE

CROSS-REFERENCE TO RELATED APPLICATIONS

This application is a National Stage of International Application No. PCT/IB2011/055083, filed Nov. 15, 2011, which, in turn, claims the benefit of U.S. Provisional Application No. 61/415,363, filed Nov. 19, 2010. All of the foregoing application are incorporated by reference in their entireties.

TECHNICAL FIELD

This invention concerns the field of integrated receiver/decoder receiving data from a central broadcasting equipment; the access to these data being subject to conditional access.

BACKGROUND

A major problem in software security is to prevent illegitimate copying and usage of software.

In a pure software solution, this problem is impossible to solve in a disconnected use case. However, when a connection is available to a trusted entity (e.g., a verification server), this connection can be used to deploy some security mechanisms (both in the case of a continuous connected as an occasionally connected use case). Despite this, in a distributed use case (where a large population of users is allowed to use the software), it is still difficult to detect and block copies.

Locking software to the hardware of their platform is not always an option. First of all, this may not be feasible due to the lack of trusted hardware or a bootstrap mechanism. Secondly, a user should always be allowed to migrate his software to another platform, or to change his hardware or software configuration.

In the present setting, a player can be easily cloned with all his secrets and run on thousands of computers at the same time. Therefore, a user paying a flat fee to access content would have a good incentive to resell copies (clones) of his player to other users.

SUMMARY OF THE INVENTION

In order to solve this problem, the present invention suggests a method for detecting a cloned software that is used on a client user unit. This user unit communicates with a server for requesting a service by sending a client request from the client user unit to this server. The latter is connected to a database comprising client records. Each of these records comprises at least a value, named tag value, which is associated to a specific client user unit. This tag value is used as a track of the usage history of each client (partial or full history). To this end, this value can for example be a hash value or a digest resulting from a compression function. This method comprises an initialization phase and an operating phase:

a) the initialization phase comprising the steps of:
defining said tag value as being an initial random value,
opening a new record for storing this tag value,
introducing said tag value ($t_c$) into the client user unit,
b) the operating phase comprising the steps of:
preparing, on the user unit side, a client message for the server comprising the request and the tag value, then
sending this client message, from the user unit to the server,
performing an access condition test, on the server side, by testing if the tag value of the client message corresponds to the tag value stored in the database, in negative event: deny the requested service, whereas in positive event:
sending a server message to the user unit, as a response to the client request,
updating the tag value, both on the server side and on the user unit side, by replacing it by a new tag value derived on the one hand from the last tag value and on the other hand from other data known by the client and by the server,
storing the new tag value on the server side by updating the corresponding record and on the client side by updating the content of memory of the user unit.

BRIEF DESCRIPTION OF THE DRAWINGS

The present invention will be better understood thanks to the attached figures in which:

FIG. 2b illustrates another variant of the embodiment shown in FIG. 2a.

DETAILED DESCRIPTION

The main idea of the solution suggested in the present invention is based on the observation that each client software component (e.g. a media player) will have a different content usage. Each content usage generates a unique usage history which allows to trace the legitimacy of the software and facilitate the detection of illegitimate copies.

More concretely, a server will keep track of the usage history of each client via the use of the tag value. The tag value represents the usage (partially or fully) while preserving the privacy of the history. At every valid request, this tag value will preferably be updated, thus causing a de-synchronization between copies made from this implementation, given that when a copy is made, it will fork from the history of the original client, and its usage will deviate from the usage of the original client. It is precisely this deviation which can be detected.

Figure 1:
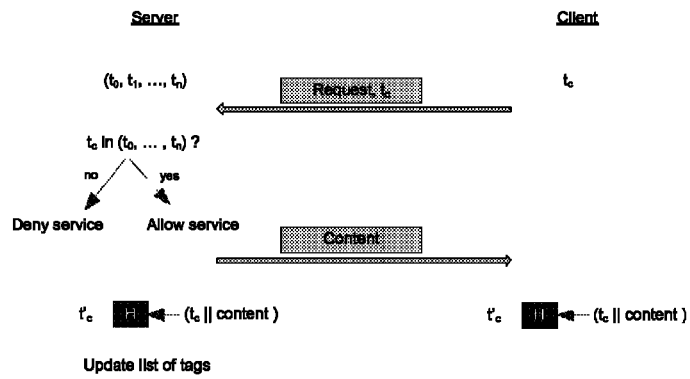
FIG. 1 shows a cloning detection diagram, which is based on a dynamic tag verification, according to a first embodiment of the present invention.

Referring to FIG. 1 showing a first embodiment of the invention, each client (C) receives an initial random tag value $t_c$ which can be embedded into the software player at initialization time or which can be transmitted by the server during the first authentication with the latter. The server will have the tag values of all clients in a database. This initial tag value $t_c$ may be also sent to the client of the user unit by any conventional communication means such as, but not limited to, a letter, a SMS, a phone call, an email, a web page, or any combination thereof. At its side, the server has opened a new record in its database for storing this tag value $t_c$. Thus, both the user unit and the server possess the same tag value $t_c$ at the end of this first phase, named initialization phase.

In order to implement this initialization phase, the following steps are undertaken:

defining the tag value ($t_c$) as being equal to an initial random value, opening a new record storing said tag value ($t_c$) in the server database, introducing this tag value ($t_c$) into the client user unit.

The step aiming to define the tag value as being an initial random value aims to take an unpredictable value as first tag value.

During an operating phase and while referring still to FIG. 1, when a client requests a service from the server, via a common communication network connecting the client user unit to this server, his tag value $t_c$ will be sent along, within a message named client message. The server will verify if the tag value, included in the client message, is also present in its database If such a comparison give a correct result, the server will grant the requested service (or proceed with verifying other requirements). If the tag value sent within the client message is not listed in the database or cannot be verified correctly, then the requested service will be refused.

The tag value $t_c$ can be the digest of a compression function, such as a cryptographic hash function, applied to the client request. Although good derivation functions provide digests that are difficult to guess, an attacker such as a man-in-the-middle, known by the person skilled in the art, could still attempt to gain access to a service either by grabbing or guessing tag values.

To prevent any attack, a first solution is to undertake communications between the client and the server through a protected channel (i.e. by means of an encrypted and authenticated communication between client and server). In this case, the tag value can be directly appended to the request, and hence the server can perform a direct verification by checking if the tag is comprised in the database of the server (as shown in FIG. 1).

Besides, if a cryptographic hash function is used to derive a new tag from the old tag and usage history, then this tag value is unique per user and can therefore be used as an identifier for identifying each client. This facilitates an anti-cloning verification without the need to associate requests to individuals and therefore leading to transparent, faster and anonymous verifications (however, this does not exclude to append a unique client identifier to the request in the client message). Depicted in FIG. 1, this use-case is a remote attestation protocol that should only be used in cases where a malicious person is not able to actively spoof and tamper with the connection between the client and the server (e.g., in a secure home-domain or when communication between client and server are over an authenticated secure channel).

Corresponding to each valid request, both the client and the server will update the tag value. The new tag value $t'_c$ will be derived from data that is known by both the client and the server: for instance, the old tag value and information obtained from at least a part of the content of the server message that is provided as response to the client request. Alternately, the new tag value $t'_c$ can derive from the last tag value $t_c$ and from at least a part of the content of the client message. The server message or the client message (or a part of their content) can be a timestamp that is embedded in the media stream or any other header information, over-encrypted cryptographic keys that are sent along, specific frames, etc. The new tag value $t'_c$ being destined to replace the old tag value $t_c$.

To this end, this operating phase requires the steps of:

preparing, on the user unit side, a client message comprising a request together with the tag value $t_c$, then sending this client message, from the user unit to the server, performing an access condition test, on the server side, aiming to test if this tag value $t_c$ is comprised in the database of the server. In negative outcome (i.e. negative event): deny the requested service, whereas in positive outcome (i.e. positive event):

sending a server message to the user unit, as a response to the client request, updating the tag value $t_c$, both on the server side and on the user unit side, by replacing this value $t_c$ by a new tag value $t'_c$. This new tag value $t'_c$ being derived from the last tag value $t_c$ and from other data known by both the client and the server, storing the new tag value $t'_c$ in the user unit (i.e. in a memory) and in the record of the database connected to the server (e.g. by replacing the old tag value $t_c$).

If a copy of the client software implementation is made, a de-synchronization will occur when one of them (either the original or the copy) requests a service. Hence, an authentic user has no incentive to share his client software implementation, since the use of the copy would eventually deny his original to be able to be granted access.

Advantageously, a user can still migrate his software implementation to another platform without any problem.

Figure 2A:
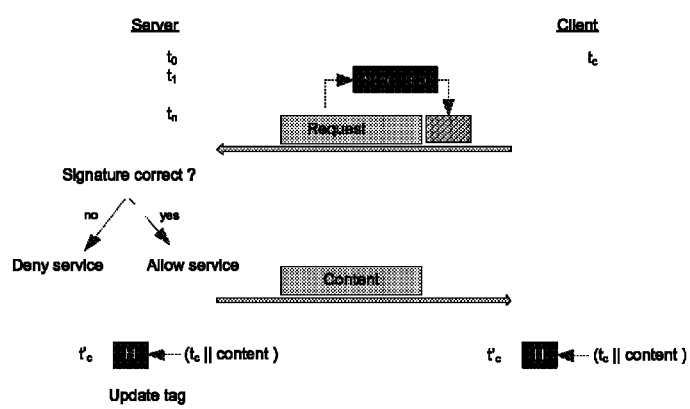
FIG. 2a illustrates a second embodiment of the invention, in particular a message authentication based on a dynamic credential to detect cloning.

Referring to FIG. 2a, the latter discloses another embodiment of the invention which is usable for preventing any attack while using an unsecured channel. The solution suggested in this embodiment aims to sign the client request by using a key, deriving directly or indirectly from the tag value $t_c$, obtained by a signature key derivation function. Thus, during the operating phase, when a client requests a service from the server (e.g. via an unsecured communication channel), a signature of the request will be sent along with the request within the client message. As shown in FIG. 2a, this signature can be appended to the request as an authentication code of the client message. This signature is obtained firstly by applying a compression function to the client request in order to obtain a digest of the request, then encrypting this digest with a signature key which is derived from the tag value and obtained by using the signature key derivation function. For instance, the compression function can be a hash function or a HMAC function which takes as key the tag value $t_c$, or a value derived thereof. By this way, the value of the signature depends on the tag value. The server is able to verify the authentication of the client request by comparing the signature comprised in the client message with a signature computed by the server in a similar manner to that determined by the client user unit. To this end, the server uses the same signature key (obtained from the same signature derivation function and the tag value stored in its database) to decrypt the signature appended to the request and then obtaining the digest of this request. Then, the server computes a digest from the request by using the same compression function as that used by the user unit. If this digest is identical to the decrypted digest, therefore the comparison gives a correct result and the signature is defined as being valid. If the signature is valid, the server will grant the requested service (or proceed with verifying other requirements) and the tag value can be updated as mentioned above in reference to FIG. 1. If the signature sent within the client message cannot be verified correctly, therefore the requested service will be refused (further steps can also performed by the server as consequence of a denied service).

In order to implement the embodiment shown in FIG. 2a, the initialization phase disclosed with the embodiment shown in FIG. 1 has to be amended by undertaking the following additional steps:

- defining a signature function (e.g., an HMAC function) and a signature key derivation function to obtain a signature key (derived preferably from said tag value $t_c$) for encrypting a digest resulting from this signature function,
- sharing the definition of this signature function and the definition of the signature key derivation function between the user unit and the server.

As previously disclosed with reference to FIG. 1, sharing these data during this initialization phase can be achieved through many different manners, as long as the value and/or function can be introduced, at the end of this step, into the client user unit. At the end of this initialization phase, the user unit and the server possess the same initial data.

The operating phase of the embodiment illustrated by FIG. 2a further requires the following steps, in addition to or instead of those relating to the first embodiment (same phase):

- calculating an authentication code by applying the signature function to the client request and by using the signature key for encrypting the digest resulting from said signature function, then amending the preparation step of the client message by preparing a client message comprising the authentication code and the client request,
- amending the access condition by checking if the authentication code received within the client message is equal to an authentication code calculated by the server by applying the same signature function to the client request and by using the same signature key for decrypting said digest; where the signature key is preferably derived from the expected tag value that is stored in the server database.

Figure 2B:
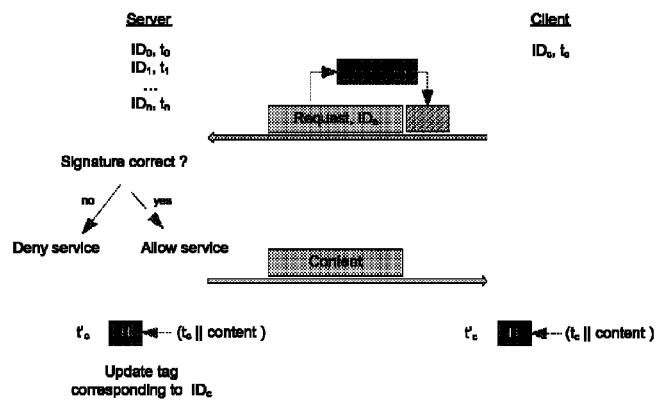

Referring now to FIG. 2b, the latter shows a variant of the embodiment shown in FIG. 2a. During the initialization phase, each client software implementation has installed a unique identifier IDc, and an initial random tag value $t_c$. The server stores the tuples (IDc, $t_c$) of all his legitimate clients. Thus, with respect to the initialization phase of the embodiment shown in FIG. 2a, the following additional steps are undertaken:

- allocating a unique identifier IDc to the client and storing this client identifier IDc in the new record assigned to this client,
- sharing this identifier IDc between the user unit and the server (preferably jointly with the definition of the signature function).

As previously mentioned, sharing or obtaining these data during this initialization phase can be achieved through several manners, as long as data can be introduced, at the end of this step, into the client user unit. The goal of this step is the same as for the previous embodiments, namely that the user unit and the server possess the same initial data.

When a client requests a service, he sends along his identifier and a signature of the request, which authenticates his request. Preferably, the signature uses the stored tag value as a key (or the key is derived from this tag value).

The server is able to verify the signature, since it knows the signature function and is able to derive the signature key that is used from the tuple corresponding to the client's identifier. Only when the signature is correct, a service will be granted.

Corresponding to each valid request, the client and server will update the tag value $t_c$ in the same way as disclosed for the previous embodiments. Thus, a new tag value $t'_c$ will be computed from the old tag value $t_c$ on the one hand, and from information obtained from the content that is provided on the other hand. In the server database, the new tag will replace the old tag.

From the foregoing, it should be noted that the operating phase of the embodiment illustrated by FIG. 2b further requires the following steps, in addition to or instead of those relating to the first embodiment shown in FIG. 2a (same phase):

- amending the preparation step of the client message by including the client identifier IDc into the client message.

Optionally, the server can send a software update to a client, changing the used signature function and/or parameters, or may decide to replace the tag value $t_c$ by a new tag value $t'_c$. This technique can be applied to any embodiment and could be used to disable hackers that have been able to fetch a tag value and/or reverse engineer the used signature function or the function to compute a new tag value (e.g., the cryptographic hash function). Since in this case, they could attempt to fight the de-synchronization, which occurs when clones are used, by deploying a central 'resynchronization' service or a proxy between the clones and the server.

The use of a hash function is recommended for achieving the invention in accordance with the first embodiment shown in FIG. 1. This follows from the fact that the tag values (namely the hash values) stored in the server database must be difficult to guess and need to remain different when they are updated. No collision should occur between two authentic client implementations. That is, if all authentic clients start with a different initial tag value, a collision in the hash values would imply that the cryptographic hash function is shown to be insecure (with respect to the collision-resistance property that is required for cryptographic hash functions).

However, according to the embodiment shown in FIG. 2b, this recommendation can be relaxed since each tag value is linked to a unique identifier, i.e. to the client identifier IDc. The only recommendation is that the signature key, which is either identical to the tag value $t_c$ or preferably derived from this tag value, remains unpredictable for malicious users having no knowledge of the tag value $t_c$. Hence, sufficient entropy should remain from the input. The tag derivation function calculates the new tag value $t'_c$ on the basis of the (old) tag value $t_c$ and at least a part of the content of the message. By this way, a chain holding information obtained throughout the entire past history is carried out.

A fallback mechanism is also suggested by the present invention in case of accidental desynchronization, for instance when a client needs to fall back to a previous backup after his system has crashed, or when his software has been cloned unintentionally. A fallback procedure can be implemented via a conventional authentication process, for instance by presenting correct credentials. At the end of this procedure, the tag value corresponding to the unique client identifier can be replaced on the client side (in the user unit) and server side (in the memory of the server). This will render each clone that uses the same identifier useless.

To perform such a fallback mechanism, the operating phase of any embodiment will comprise a resynchronization step amending the updating step by the following steps:

- replacing the tag value $t_c$ by a new tag value $t'_c$ equal to a new random value,
- then sending said new tag value $t'_c$ to the user unit.

Figure 3:
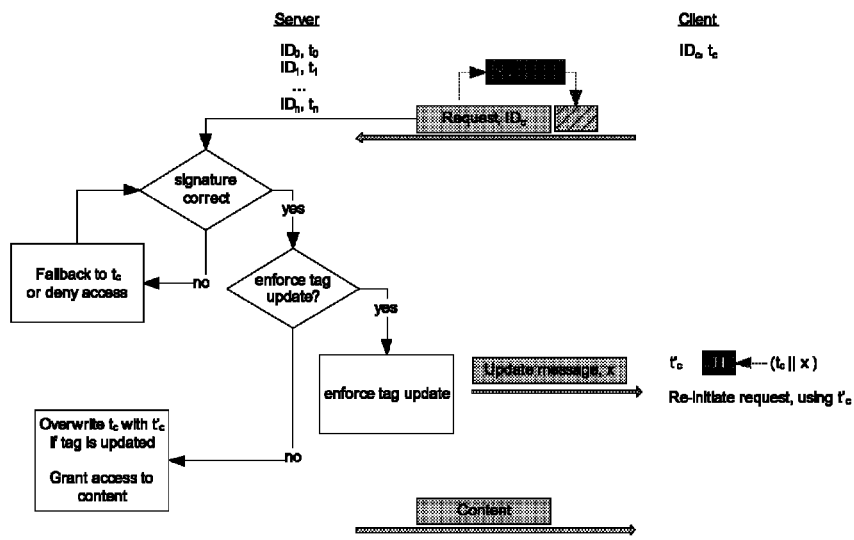
FIG. 3 illustrates a third embodiment of the invention, where a tag update condition is enforced prior to content delivery.

Referring to FIG. 3, the latter suggests a third main embodiment for the present invention. According to this variant, the client user unit will append to each request a signature as is also done in the second embodiment of this invention (see FIG. 2a and FIG. 2b). Once the server has verified the signature as being valid, the server can decide either to enforce an update of the tag (forcing the client to request the service again, thus allowing the server to prove that the tag value of the client user unit has been updated), or not to do so and directly send the content in response to the request. In contrast to the previous embodiments of this invention, the new tag value $t'_c$ is no longer updated on the basis of the content that is sent. The decision whether or not to enforce a tag update depends on business logic. Checking if the tag value $t_c$ has to be updated can be carried out by a test based on a temporal parameter or on a characteristic which may depend on the significance of the client request for instance. A tag update can be enforced for each content request, or only for valuable content only, or once a day, or depending on any other parameters imaginable. The decision whether or not to enforce an update of the tag value could be also applied to the other embodiments shown in FIGS. 1, 2a and 2b by adding, to the operating phase, a step aiming to take such a decision. In this case, the client user unit must be informed, at each time a server message is sent as a response to a client request, whether or not the tag value has been updated by the server. For instance, a specific value could be added or appended to the server message in order to provide such information to the client user unit.

Returning to the embodiment shown in FIG. 3, to enforce a tag update, the server will send to the client user unit a specific message (i.e. an update message) that includes an update value (denoted by the letter X in this figure) that will be used when deriving the new tag value $t'_c$. For instance, this update value (X) can be a random value, a header information or metadata information. After this step, the server will expect the client user unit to start the request procedure again from the beginning, namely just after the initialization phase and after having introducing the new tag value $t'_c$ that derives on the one hand from the previous tag value tc and on the other hand from the update value (X) comprised in the update message. In this way, the server can easily verify if the tag has been updated or not. As long as no signature has been received that corresponds to the new tag value, the server will use the old tag and keep repeating the tag update enforcement step. Alternately, the requested service can be denied, for instance after a certain number of failed attempts. Thus, a test aiming to count (by means of a specific counter) the number of unsuccessful attempts, until a predefined threshold, can be performed to decide either to send a server message to the user unit without updating the tag value $t_c$, or to deny the requested service. Once a signature that corresponds to the new tag has been received, the requested service can be delivered to the client.

This third main embodiment, as shown in FIG. 3, further requires:

a) replacing the steps in the positive outcome of the access condition test performed within the operating phase by a conditional step aiming to check if the tag value ($t_c$) has to be updated:

in positive event: firstly to update the tag value $t_c$, both on the server side and on the user unit side, by sending from the server to the user unit an update message including an update value X and by replacing the tag value $t_c$ by a new tag value $t'_c$ derived from the last tag value $t_c$ and from the update value X, then storing the new tag value $t'_c$ in the record of the database of the server and in the memory of the user unit, in negative event: directly sending the server message to the user unit, as a response to the client request (in this latter case, the tag value $t_c$ is not updated), b) replacing the steps in the negative outcome of said access condition test by a test aiming, by means of an unsuccessful attempts counter used to count a number of successive negative outcomes relating to said access condition, to check if this number has reached a predetermined threshold:

in negative event: sending a server message to the user unit without updating the tag value ($t_c$), in positive event: denying the requested service.

Regarding the positive event of the conditional step aiming to check if the tag value has to be updated (as mentioned above under the part denoted a) within the operating phase), it should be noted that the client user unit is forced to resend the client request while using the updated tag value. According to another appropriate variant, a message can be sent to the client user unit in order to require the latter for requesting the service again by using the updated tag value. This allows the server to ensure that the tag value has been updated on the client side.

Although the embodiment illustrated by the FIG. 3 is shown as a variant of the embodiments shown in FIGS. 2a and 2b, it should be noted that the above-mentioned steps performed in these positive and negative events can be also applied to the method according to the first embodiment, by replacing the steps performed under the positive and negative outcomes of the access condition test of the first embodiment.

Whatever the embodiment, it should be noted that the tag value that is associated with each client captures the usage history of the client (and is initialized with a random value). Preferably, it is ought to be unique for each client, in particular if no identifier IDc is assigned to the client, and will change after each valid request. Hence, it can be used as a source of randomness to derive other keys (e.g. a session key for secure communications between client and server), or to enable run-time software diversity.

The random values can be provided either by the server, e.g. during the first communication with the client, or by the software, e.g. during its first use and/or the first communication with the server.

Preferably, the messages and/or values sent between the server and the client user unit in the method of the present invention are exchanged within a secure communication channel, independently from the embodiment used. Such a secure communication channel can be obtained by encryption of at least a part of exchanged contents/communications. For instance, at least a part of the content of a message can be encrypted. Furthermore, the exchanged communications can be signed. Besides, the tag value $t_c$, $t'_c$ can be used to derive at least an encryption key for encrypting said exchanged contents.

Advantageously, the present invention allows, firstly to produce identical software copies intended to be distributed to individual customers, and secondly, after the initialization phase, to provide an individualization of each software implementation which will lead its own life by having unique data at its disposal that can be used to enable spatial diversity.

Depending on business logic, it may sometimes be desired to allow a limited amount of software clones. Users may be allowed to copy a client software implementation onto another device, and have a limited amount of clones running independently. To achieve this, the server will fork a new tuple (IDc1, tc1) from the original tuple (IDc, tc) as soon as an incorrect tag has been detected and policies allow a new clone. The presented identifier needs to be a correct identifier IDc. The new tuple can be associated with the original identity, e.g. by storing the cloned new client identifier IDc1 in a specific record of the original client identifier IDc (within the server database), to keep association between the cloned new tuple and the original client identifier IDc (or the original client user record). By providing counting means (e.g. means for incrementing by one unit) for counting the number of associations, i.e. the number of those specific records which are associated to an original client identifier, this allows to monitor how many clones this original identifier has and to know the identifier (IDc1, IDc2, ... ) of these authorized clones. Comparison means may be provided for comparing the number of these specific records with a predefined threshold determining the maximum number of authorized clones for a certain original client identifier. If the result of this comparison is equal or upper than this threshold, the requested will be denied and no new authorized clone will be allowed to this original client identifier. On the contrary, if the threshold is not reached (or not exceeded), a new identifier IDc1 and a new tag tc1 will then be enforced on the cloned client user unit, using a dedicated command or any suitable operation to provide this new data to this new client user unit. From then on, the clone can be seen as a new authentic user unit.

According to a slightly different way, in order to monitor how many clones a certain identity has, each client record (identified by it client identifier IDc), may include a count value. This value is incremented (or decremented) by one at each time a software clone is derived from this client. Thus, the served knows, at any time, how many software clones have been generated by a certain client.

To avoid that a cloned client identifier generates further software clones at its turn, each record resulting from a software clone generation will be provide with a cloning tag used to identify which client identifier is a so-called "cloned identifier" and which client identifier is an initial identifier. The same function as that provided by such a cloning tag can be obtained by storing, in the new record corresponding to the so-called "cloned client identifier", a count value reaching immediately the above-mentioned threshold.

Limiting amount of software clones is a variant that is applicable to the embodiments shown in FIG. 2b and FIG. 3. To carry out such software clones limitation, the steps below referring to the embodiment shown in FIG. 2b has to be taken into account with respect to the negative outcome of the access condition test of the method. This negative outcome will be replaced by (or will also include) the following conditional step together with the other following steps:

(or) checking if the client identifier IDc included to the client message is already stored in one of the records of the database: in negative event, deny the requested service, whereas in positive event:

incrementing by one unit a count value of a client counter associated to said client identifier IDc in its record, then check if this client counter reaches a predetermined threshold, in positive event: deny the requested service, whereas in negative event (the generation of a new clone is authorized):

storing the count value of the incremented client counter in said record, assigning a new unique client identifier IDc to the client by storing, in a new record of the database, this new unique client identifier IDc together with a new tag value $t'_c$ (random value) and with a count value, stored as client counter, which reaches said predetermined threshold, sending a server message to the user unit, as a response to the client request, providing the new unique client identifier IDc and the new tag value $t'_c$ to the client (client user unit), storing the new tag value $t'_c$ in the record of the database of the server and in the client user unit (i.e. in the memory of the client user unit).

In order to provide the new client IDc and the new tag value to the new client user unit, this operation (step) can be achieved by any conventional communication means such as, but not limited to, a letter, a SMS, a phone call, an email, a web page, or any combination thereof. Alternately, this information can be transmitted to the client by including the new unique client identifier and the new tag value into the server message sent to the client user unit. This information can also be attached to the server message or sent separately.

It should be noted that the method of the present invention does not prevent the clones from playing already purchased content: it only prevents that clones can request new services. This is an inherent issue with client media players that can be used offline, since only a server-side verification can be performed when the client software component connects to the online service.

The client software implementation needs to be stateful.

In terms of privacy issue, the method suggested in this invention discloses that the tag values are derived from the usage history and from the initial tag value. However, when cryptographic hash functions are used to derive new tag values, these values do not expose any usage history information (due to the pre-image resistance property of cryptographic hash functions).

Besides, it is further possible to include additional information that is sent from the server to the client; e.g., a random offset that can be included in the update process, or an encrypted new hash value.

The invention claimed is:

1. A method to detect a cloned software to be used on a client user unit communicating with a server for requesting said server to deliver media content to be played on the client user unit, by sending a request for the media content from the client user unit to the server, the server being connected to a database comprising client records, each of the client records comprising at least a tag value enabling run-time software diversity, the method comprising:
an initialization phase comprising:
defining the tag value as being equal to an initial random value;
opening a new record storing the tag value; and
introducing the tag value into the client user unit; and
an operating phase comprising the steps of:
preparing, on the client user unit side, a client message for the server comprising the request for the media content and the tag value;
sending the client message from the client user unit to the server;
performing an access condition test, on the server side, by checking whether the tag value of the client message is in the database;
denying the request when the tag value of the client message is not in the database;
when the tag value of the client message is in the database:

sending a server message to the client user unit as a response to said request, said server message comprising the requested media content;

calculating, both on the server side and on the client user unit side, a new tag value derived from a last tag value and from at least a part of the request comprised in said client message or a part of the media content comprised in said server message so that said new tag value represents a specific track of at least a partial media content usage history of a client;

updating said tag value by replacing it with said new tag value; and storing the new tag value in the record of the database of the server and in the client user unit.

2. The method of claim 1, wherein the part used to calculate the new tag value is a timestamp.

3. The method of claim 1, wherein the client message further comprises a unique identifier assigned to the client.

4. The method of claim 1, wherein:

the initialization phase further comprises the steps of:

defining a signature function and a signature key derivation function for encrypting a digest resulting from the signature function;

sharing the definition of the signature function and the signature key derivation function between the client user unit and the server;

the operating phase further comprises the steps of:

calculating an authentication code by applying the signature function to the request and using the signature key for encrypting the digest resulting from the signature function, then performing the preparation step of the client message by preparing the client message comprising the authentication code and the request; and testing if the authentication code received within the client message is equal to an authentication code calculated by the server by applying the same signature function to the request comprised in the client message and using the same signature key for processing the digest; the signature key being preferably derived from the expected tag value that is stored in the server database.

5. The method of claim 4, wherein:

the initialization phase further comprises the steps of:

assigning a unique identifier to the client user unit and storing this identifier in the new record;

sharing said unique identifier between the client user unit and the server;

the operating phase further comprises the step of:

amending the preparation step of the client message by including the client unique identifier into the client message.

6. The method of claim 4, wherein the signature key is either identical to the tag value of the client user unit or derived from the tag value.

7. The method of claim 4, wherein the signature key is an unpredictable value.

8. The method of claim 1, wherein the operating phase comprises a resynchronization step amending the updating step by replacing the tag value by a new tag value equal to a new random value, then sending the new tag value to the client user unit.

9. The method of claim 1, wherein the client message and/or the tag value sent between the server and the client user unit are exchanged within a secure communication channel.

10. The method of claim 9, wherein the secure communication is obtained by encryption of at least a part of media content.

11. The method of claims 10, wherein the tag value is used to derive at least an encryption key for encrypting the media content.

12. A method to detect a cloned software to be used on a client user unit communicating with a server for requesting said server to deliver media content to be played on the client user unit, by sending a request for the media content from the client user unit to the server, the server being connected to a database comprising client records, each of the client records comprising at least a tag value enabling run-time software diversity, the method comprising:

an initialization phase comprising:

defining the tag value as being equal to an initial random value;

opening a new record storing the tag value; and introducing the tag value into the client user unit; and an operating phase comprising the steps of:

preparing, on the client user unit side and sending to the server, a client message comprising the request for the media content and the tag value;

(1) checking at the server whether the tag value has to be updated:

(2) when the tag value has to be updated, updating the tag value on the server and on the client user unit by:

(3) sending from the server to the client user unit an update message including an update value;

(4) calculating, both on the server side and on the client user unit side, a new tag value derived from a last tag value and from said update value;

(5) replacing the tag value with the new tag value;

(6) storing the new tag value in the record of the database of the server and the client user unit;

repeating steps 1-6 checking whether the tag value has to be updated until a check counter has reached a predetermined threshold;

(7) when the tag value does not have to be updated:

(8) sending a server message to the client user unit, as a response to the request, said server message comprising the requested media content;

(9) calculating, both on the server side and on the client user unit side, a new tag value derived from a last tag value and from at least a part of the request comprised in said client message or a part of the media content comprised in said server message so that said new tag value represents a specific track of at least a partial media content usage history of a client;

(10) replacing the tag value with the new tag value derived from the last tag value and from at least a part of the request comprised in said client message or a part of the media content comprised in said server message; and

(11) storing the new tag value derived from the last tag value and from at least a part of the request comprised in said client message or a part of the media content comprised in said server message in the record of the database of the server and in the client user unit.

13. A method to detect a cloned software to be used on a client user unit communicating with a server for requesting said server to deliver media content to be played on the client user unit, by sending a request for the media content from the client user unit to the server, the server being connected to a database comprising client records, each of the client records comprising at least a tag value enabling run-time software diversity, the method comprising:
  an initialization phase comprising:
    defining the tag value as being equal to an initial random value;
    opening a new client record storing the tag value;
    introducing the tag value into the client user unit;
    assigning a unique identifier to the client user unit and storing the unique identifier in the new client record; and
    sharing the unique identifier between the client user unit and the server; and
  an operating phase comprising the steps of:
    preparing, on the client user unit side, a client message for the server comprising the request for the media content, the client unique identifier and the tag value;
    checking whether the client unique identifier included in the client message is already stored in one of the records of the database;
    denying the request when the client unique identifier is not stored in one of the records of the database;
    when the client unique identifier is stored in one of the records of the database:
      incrementing by one unit a value of a client counter associated with the client unique identifier in a client's record;
      checking when the client counter associated with the client unique identifier reaches a predetermined threshold;
    when the predetermined threshold is not met:
      storing the value of the incremented client counter in the client's record;
      assigning a new unique client identifier to the client by storing, in a new record of the database, the new unique client identifier, a new tag value and a new client counter, which reaches said predetermined threshold;
    sending a server message to the user unit, as a response to said request, said server message comprising the requested media content;
    calculating, both on the server side and on the client user unit side, a new tag value derived from a last tag value and from at least a part of the request comprised in said client message or a part of the media content comprised in said server message so that said new tag value represents a specific track of at least a partial media content usage history of a client;
    updating said tag value by replacing it with said new tag value derived from the last tag value and from at least a part of the request comprised in said client message or a part of the media content comprised in said server message; and
    storing the new tag value derived from the last tag value and from at least a part of the request comprised in said client message or a part of the media content comprised in said server message in the record of the database of the server and the client user unit.

\* \* \* \* \*